United States Patent [19]
Coolbaugh et al.

[11] Patent Number: 5,530,068
[45] Date of Patent: Jun. 25, 1996

[54] SOLID ELASTOMETRIC BLOCK COPOLYMERS

[75] Inventors: Thomas S. Coolbaugh, Morrisville; Frederick C. Loveless, Yardley, both of Pa.; Demetreos N. Matthews, Ewing, N.J.

[73] Assignee: Mobil Oil Corporation, Fairfax, Va.

[21] Appl. No.: 443,746

[22] Filed: May 18, 1995

Related U.S. Application Data

[62] Division of Ser. No. 402,666, Mar. 13, 1995, Pat. No. 5,470,914, which is a division of Ser. No. 282,297, Jul. 29, 1994, Pat. No. 5,399,629, which is a division of Ser. No. 143,718, Nov. 1, 1993, Pat. No. 5,352,743, which is a division of Ser. No. 836,577, Feb. 18, 1992, Pat. No. 5,276,100, which is a continuation-in-part of Ser. No. 735,552, Jul. 25, 1991, Pat. No. 5,292,820, and a continuation-in-part of Ser. No. 466,233, Jan. 16, 1990, Pat. No. 5,187,236.

[51] Int. Cl.$^6$ ................................................. C08F 297/02
[52] U.S. Cl. ........................... 525/314; 525/250; 525/271
[58] Field of Search ........................ 525/314, 250, 525/271

[56] References Cited

U.S. PATENT DOCUMENTS

| | | | |
|---|---|---|---|
| 4,879,349 | 11/1989 | Hoxmeier et al. | 525/332.8 |
| 5,147,939 | 9/1992 | Hellermann et al. | 525/314 |
| 5,229,464 | 7/1993 | Erickson et al. | 525/314 |

FOREIGN PATENT DOCUMENTS

| | | |
|---|---|---|
| 0315280 | 5/1989 | European Pat. Off. . |
| 328729 | 7/1989 | Japan . |

OTHER PUBLICATIONS

Falk, Journal of Polymer Science: Part A-1, vol. 9, 2617–2623 (1971).
Falk, Die Angewandte Chemie 21 (1972) 17–23 (No. 236).
Mohajer et al., Polymer 1982, vol. 23, Sep., 1523–1535.

*Primary Examiner*—Mark L. Warzel
*Attorney, Agent, or Firm*—Ronald A. Bleeker; Malcolm D. Keen

[57] ABSTRACT

There are disclosed novel, solid, elastomeric block copolymers with improved resistance to cold flow wherein either 1) the terminal blocks are each a polymer (I polymer) of at least one conjugated diene I, e.g., isoprene, which contains at least five carbon atoms with at least one of each pair of double-bonded carbon atoms in the polymerized diene I units being additionally single-bonded to two carbon atoms; at least one middle or interior block is a hydrogenated polybutadiene (B polymer); and at least one middle or interior block is an essentially straight chain polyethylene (E polymer) resulting from the hydrogenation of a polybutadiene composed of at least 80% of 1,4- units; or 2) the terminal blocks are random IB copolymers of at least one diene I as previously defined and hydrogenated butadiene, and at least one middle or interior block is a straight chain polyethylene (E polymer) as previously defined. The hydrogenated butadiene units in the B polymer or random IB polymer blocks are composed of no more than about 65% of 1,4- units and at least about 35% of 1,2- units.

The foregoing block copolymers may be prepared by selectively hydrogenating substantially all the butadiene units of a precursor block copolymer wherein the precursor blocks of the straight chain polyethylene blocks units are polybutadiene blocks in which at least about 80% of the butadiene units are 1,4- units. A sufficient number of I units in the I polymer blocks or random IB copolymer blocks retain their unsaturation on selective hydrogenation to enable the vulcanization of the block copolymer.

14 Claims, No Drawings

SOLID ELASTOMETRIC BLOCK COPOLYMERS

CROSS-REFERENCE TO RELATED APPLICATION

This application is a division of application Ser. No. 08/402,666, filed Mar. 13, 1995, now U.S. Pat. No. 5,470,914, which is a division of application Ser. No. 08/282,297, filed Jul. 29, 1994, now U.S. Pat. No. 5,399,629, which is a division of application Ser. No. 08/143,718, filed Nov. 1, 1993, now U.S. Pat. No. 5,352,743, which is a division of application Ser. No. 07/836,577, filed Feb. 18, 1992, now U.S. Pat. No. 5,276,100, which is a continuation-in-part of application Ser. No. 07/735,552, filed Jul. 25, 1991, now U.S. Pat. No. 5,292,820 and a continuation-in-part of application Ser. No. 07/466,233, filed Jan. 16, 1990, now U.S. Pat. No. 5,187,236.

BACKGROUND OF THE INVENTION

1. Field of the Invention

This invention relates to novel, solid, elastomeric block copolymers having a degree of unsaturation sufficient for desired vulcanization or cross-linking, or other chemical modification, but not so high as to cause the copolymer to be susceptible to an undesirably large amount of oxidative, thermal or photolytic degradation, and also having improved resistance to cold flow and improved "green" strength before vulcanization.

2. Information Disclosure Statement Including Description of Related Art

The following information is disclosed in accordance with the requirements of 37 CFR 1.56, 1.97 and 1.98.

Elastomers (or rubbers) of either natural or synthetic origin usually require vulcanization for transformation into insoluble, non-deformable high strength elastomeric products. Before vulcanization, rubbers possess inferior properties and low strength which limit their utility.

There are a number of well known methods for achieving the vulcanization, also referred to as cross-linking, of unsaturated elastomers. Such methods include the use of sulfur and accelerators, peroxides, benzoquinone dioxime, certain phenolic resins and similar agents. Any of the above or any other well known vulcanizing techniques may be utilized to cross-link the elastomers of this invention.

The great majority of currently known synthetic elastomers are based on polymers or copolymers of butadiene or isoprene. These polymers, which include cis-polybutadiene, emulsion polybutadiene (EBR), styrene-butadiene copolymer (SBR), butadiene-acrylonitrile copolymer (NBR) and cis-polyisoprene, provide raw materials for the production of a very large volume of rubber goods, such as automotive tires, conveyor belts, adhesives, footwear, sponge and mechanical goods. Because of the high degree of unsaturation inherent in the polymeric backbones, these elastomers are easily and quickly vulcanizable alone or in blends. A secondary consequence of the high degree of backbone unsaturation is the instability of such elastomers in the presence of ozone and oxygen, both of which promote rapid deterioration of these elastomers.

Butyl rubber, which is a copolymer of isobutylene and 2–3% by weight (wt.) of isoprene, represents a class of elastomers far more resistant to oxygen and ozone than those based on butadiene or isoprene. The backbone of butyl rubber is primarily polyisobutylene (which provides a saturated spine) into which there is randomly copolymerized about 2–3% by wt. of isoprene to provide unsaturated sites for vulcanization. Butyl rubber finds limited use because of its relatively poor elastomeric properties, and is used primarily in applications which take advantage of its damping properties, weathering resistance and low gas permeability.

Ethylene-propylene-diene rubber (EPDM) has enjoyed substantial commercial growth as a synthetic rubber since it combines excellent oxidation resistance with good elastomeric properties. This elastomer is prepared by the polymerization of ethylene, propylene and a non-conjugated diene, such as 1,4-hexadiene, dicyclopentadiene or ethylidene norbornene. Diene incorporation is typically 5–10% by weight (wt.). The diene is randomly incorporated into the saturated ethylene-propylene backbone to provide pendant vulcanization sites.

The above prior art elastomers, with either high or low levels of unsaturation, are characterized in that, having random unsaturation, they are randomly cross-linked all along the molecular backbone during vulcanization. The success of vulcanization in incorporating all molecular chains into the final cross-linked network with minimal "loose ends" is termed the degree of network perfection. In order to insure the highest degree of network perfection attainable, randomly unsaturated elastomers must be cross-linked extensively. The large number of cross-links necessary (12 to 40 per 100,000 molecular weight) dictates that the average distance between cross-links ($M_c$) must be relatively small in comparison with the dimensions of the whole molecule. Elastomeric properties, such as elongation, depend greatly on $M_c$, e.g., the smaller the $M_c$, the lower the elongation of the vulcanized polymer.

Highly unsaturated elastomers such as polybutadiene or natural rubber retain essentially all of their original unsaturation after vulcanization. Such high level of backbone unsaturation causes these elastomers to be very susceptible to degradation by oxygen, ozone, heat and light. Such inherent instability frequently necessitates the use of appreciable amounts of expensive stabilizing additives and automatically restricts the use of these polymers in areas where degradative conditions are severe.

Another disadvantage of many prior art elastomers is that there is nothing in their molecular structure before vulcanization to prevent their deformation when subjected to external forces. This manifests itself as a lack of "green" strength and a low resistance to cold flow caused by gravity or other forces to which the polymer is exposed before vulcanization, e.g., during shipment or storage.

Various block copolymers having excellent elastomeric properties, especially elongation, have been made in the past. For example, a block copolymer commonly known as KRATON, manufactured by Shell Chemical Company, which has outstanding properties at room temperature, is a thermoplastic elastomer consisting of block segments of polymerized styrene units and polymerized aliphatic diolefin units, such as butadiene or isoprene. The most common structure of KRATON is the linear A-B-A block, such as styrene-butadiene-styrene (S-B-S) or styrene-isoprene-styrene (S-I-S). One of such rubbers is believed to be described by Jones, U.S. Pat. No. 3,431,323. Jones discloses block copolymers containing block segments of polymerized vinyl arene monomer units, e.g., styrene, butadiene monomer units, and vinyl arene units. After the block copolymer is prepared, it may be subjected to hydrogenation to such a degree that the unsaturation of the polybutadiene block is reduced to less than 10% of its original value, while 10–25% of the poly-vinyl arene block segments are hydrogenated. Although the KRATON triblock copolymers have excellent elastomeric properties at room temperature, since they are thermoplastic materials they lose these properties at temperatures of about 80° C. (and higher). In addition, since these polymers are not chemically cross-linked, they are soluble in many organic solvents. These latter two deficiencies place some restrictions on the viable areas of application for these polymers.

Falk, JOURNAL OF POLYMER SCIENCE: PART A-1, Volume 9, 2617–2623 (1971), the entire contents of which are incorporated herein by reference, discloses a method of selectively hydrogenating 1,4-polybutadiene units in the presence of 1,4-polyisoprene units. More particularly, Falk discloses selective hydrogenation of the 1,4-polybutadiene block segment in the block copolymer of 1,4-polybutadiene-1,4-polyisoprene-1,4-polybutadiene and in random copolymers of butadiene and isoprene, with both polymerized monomers having a predominately 1,4- microstructure. Selective hydrogenation is conducted in the presence of hydrogen and a catalyst made by the reaction of organoaluminum or lithium compounds with transition metal salts of 2-ethylhexanoic acid.

Falk, DIE ANGEWANDTE CHEMIE 21 (1972) 17–23 (No. 286), the entire contents of which are also incorporated herein by reference, discloses the selective hydrogenation of 1,4-polybutadiene segments in a block copolymer of 1,4-polybutadiene-1,4-polyisoprene-1,4-polybutadiene and a random copolymer of 1,4-butadiene and 1,4-isoprene.

Hoxmeier, Published European Patent Application 88202449.0, filed on Nov. 2, 1988, Publication Number 0 315 280, published on May 10, 1989, discloses a method of selectively hydrogenating a polymer made from at least two different conjugated diolefins. One of the two diolefins is more substituted in the 2,3 and/or 4 carbon atoms than the other diolefin and produces tri- or tetra-substituted double bonds after polymerization. The selective hydrogenation is conducted under such conditions as to hydrogenate the ethylenic unsaturation incorporated into the polymer from the lesser substituted conjugated diolefin, while leaving unsaturated at least a portion of the tri- or tetra- ethylenic unsaturation incorporated into the polymer by the more substituted conjugated diolefin.

Mohajer et al., *Hydrogenated linear block copolymers of butadiene and isoprene: effects of variation of composition and sequence architecture on properties*, POLYMER 1982, Vol. 23, September, 1523–1535, disclose essentially completely hydrogenated butadiene-isoprene-butadiene (HBIB), HIBI and HBI block copolymers in which butadiene has predominantly 1,4-microstructure.

Kuraray K K, Japanese published patent application Number JP-328729, filed on Dec. 12, 1987, published on Jul. 4, 1989, discloses a resin composition comprising 70–99% wt. of a polyolefin (preferably polyethylene or polypropylene) and 1–30% wt. of a copolymer obtained by hydrogenation of at least 50% of the unsaturated bonds of an isoprene/butadiene copolymer.

SUMMARY OF THE INVENTION

In accordance with this invention, novel, solid, elastomeric block copolymers with improved resistance to cold flow before vulcanization are provided wherein either 1) the terminal blocks are each a polymer, denoted as "I polymer", of at least one conjugated diene I, e.g., isoprene, which contains at least five carbon atoms with at least one of each pair of double-bonded carbon atoms in the diene I units in polymerized form being additionally single-bonded to two carbon atoms; at least one middle or interior block is a substantially hydrogenated polybutadiene, denoted as "B polymer", comprising 1,2- and 1,4- units as hereinafter defined; and at least one middle or interior block is an essentially straight polyethylene denoted as "E polymer", and resulting from the hydrogenation of a polybutadiene block comprising at least 80% of 1,4- units. The foregoing block copolymer contains, for example, an average of about 1 to 50 wt. % of I polymer blocks, about 50 to 98 wt. % of hydrogenated butadiene (B) polymer blocks, and about 1 to 30 wt. % of E polymer blocks, all based on the total weight of said block copolymer: or 2) the terminal blocks are each a random IB copolymer of at least one diene I and hydrogenated butadiene (B), both as previously defined, and at least one middle or interior block is an E polymer, as previously defined, such block copolymer comprising, for example, an average of about 70 to 99 wt. % of random IB copolymer blocks, and about 1 to 30 wt. % of E polymer blocks, all based on the total weight of block copolymer, with the I units being an average of about 1 to 50 wt. % of each random IB copolymer block and the remainder being B units. The structure of the B or IB polymer blocks in both of the foregoing classes of block polymers contains sufficient branching such that after hydrogenation, these blocks contain no more than about 10% of polyethylene crystallinity. This result is accomplished by introducing side branches into the butadiene or IB copolymer blocks, e.g., by controlling the microstructure of polymerized 1,3-butadiene. More particularly, the side branches are introduced into the polymer by insuring that the polymerized butadiene contains a sufficient amount of 1,2- units to prevent the selectively hydrogenated polymer from being excessively crystalline. Thus, the polymerized butadiene in the B polymer or IB copolymer blocks must contain not more than about 65%, preferably about 10 to about 60%, and most preferably about 35 to about 55% of 1,4- units (1,4- microstructure), and at least about 35%, preferably about 40 to about 90%, and most preferably about 45 to about 65% of 1,2- units (1,2- microstructure).

It should be noted that the foregoing B polymer blocks resulting from the hydrogenation of a group of randomly arranged 1,2- and 1,4- units of polymerized butadiene in a precursor polymer can also be described as blocks of corresponding random copolymers of ethylene and butene-1, wherein two ethylene units correspond to each hydrogenated 1,4-butadiene unit and one butene-1 unit corresponds to each hydrogenated 1,2-butadiene unit. Similarly, two ethylene units in the E polymer blocks correspond to each hydrogenated 1,4-butadiene unit in the corresponding blocks of the precursor polymer.

Specific block copolymers contemplated under this invention are the triblock copolymer

 (a)

and the pentablock copolymers

 (b)

and

 (c)

where $(I_x)$, $(B_y)$ and $(E_z)$ are polymer blocks of the polymerized units as previously defined, $(I_xB_y)$ is a random copolymer block of polymerized I and B units, and x, y and z indicate the average numbers of the denoted monomeric units in each block consistent with the weight percentage ranges of these monomer units set out previously.

Also contemplated under the invention are star-branched block copolymers comprising either 1) a combination of random copolymer blocks $(I_xB_y)$ and polymer blocks $(E_z)$ wherein the free end (i.e., uncoupled end) of each branch of the copolymer is a random copolymer block $(I_xB_y)$; or 2) a combination of polymer blocks $(I_x)$, $(B_y)$ and $(E_z)$ wherein the free end of each branch is a polymer block $(I_x)$. The number of monomeric units in each block is consistent with the weight percentage ranges of these units set out previously.

The invention also encompasses the selective hydrogenation of the precursors of the foregoing polymers such that substantially all of the residual double bonds of the precursor polybutadiene blocks of the B and E polymer blocks, or the polymerized butadiene units of the IB random copolymer blocks are hydrogenated while sufficient unsaturation remains in the I polymer blocks or the I units of the IB random copolymer blocks to provide a basis for subsequent vulcanization or cross-linking. The precursor block polymers and the vulcanized or cross-linked polymers are also included within the scope of the invention.

Finally, the invention includes processes for the preparation of the foregoing block copolymers using techniques of anionic polymerization.

The selectively hydrogenated block copolymers of this invention contain sufficient unsaturation in the terminal blocks so that they may be adequately vulcanized to provide near network perfection with the resulting superior mechanical properties at both room and elevated temperatures, while the substantially complete lack of ethylenic unsaturation in the middle or interior blocks provides for a high degree of oxidative, thermal and pyrolytic stability. Moreover, the high degree of crystallinity of the interior E polymer blocks provide for higher green strength and the elimination or reduction of cold flow of the polymer before vulcanization. Subsequent vulcanization or cross-linking of the selectively hydrogenated polymer results in a further improvement in properties, e.g., high elongation and elasticity at room and elevated temperatures and excellent aging characteristics.

DETAILED DESCRIPTION OF THE INVENTION

General

In the block copolymers of this invention, including triblock copolymer (a), i.e., $$(I_xB_y)\text{-}(E_z)\text{-}(I_xB_y) \qquad (a)$$

and the pentablock copolymers (b) and (c), i.e., $$(I_x)\text{-}(E_z)\text{-}(B_y)\text{-}(E_z)\text{-}(I_x) \qquad (b)$$

and $$(I_x)\text{-}(B_y)\text{-}(E_z)\text{-}(B_y)\text{-}(I_x) \qquad (c)$$

and the star-branched block copolymers comprising either (1) a combination of $(I_xB_y)$ and $(E_z)$ blocks wherein each branch contains an outermost $(I_xB_y)$ block; or a combination of $(I_x)$ $(B_y)$ and $(E_z)$ blocks wherein each branch contains an outermost $(I_x)$ block, the I units prior to any hydrogenation are at least one polymerized conjugated diene having at least five (5) carbon atoms and the following formula $$R^1-\underset{\underset{R^2}{|}}{C}=\underset{\underset{R^3}{|}}{C}-\underset{\underset{R^4}{|}}{C}=\underset{\underset{R^5}{|}}{C}-R^6 \qquad (1)$$

wherein $R^1$–$R^6$ are each hydrogen or a hydrocarbyl group, provided that at least one of $R^1$–$R^6$ is a hydrocarbyl group, and further provided that the structure of the residual double bond in the polymerized block I has the following formula $$R^I-\underset{\underset{R^{IV}}{|}}{C}=\underset{\underset{}{|}}{C}-R^{III} \atop {\underset{}{|} \atop R^{II}} \qquad (2)$$

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;

the B units represent hydrogenated 1,2- and 1,4-butadiene units as defined hereinbefore, wherein the structure of the residual double bonds prior to hydrogenation are as indicated in the following formulae:

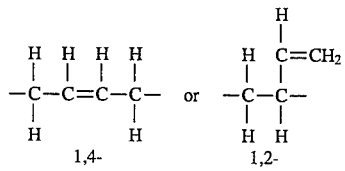

the E units represent preponderantly straight chain ethylene units resulting from the selective hydrogenation of a polybutadiene block in the precursor polymer which may be composed of at least about 80% of 1,4- units. (Up to 20% of the latter polybutadiene blocks in the precursor polymer may be composed of 1,2- units which on selective hydrogenation are converted to polymerized butene-1 units.) In each of the foregoing block copolymers, the average total molecular number of polymerized I units, i.e., 2x in block copolymers (a), (b) and (c), and the average molecular total in all the branches of the contemplated star-branched block copolymers, per 100,000 M.W., i.e., per 100,000 of the total molecular weight of the block copolymer, is, for example, about 15 to 735, preferably about 10 to 370, and more preferably about 30 to 150; the average total molecular number of polymerized butadiene (B) units, i.e., y in block copolymer (b), 2y in block copolymers (a) and (c), and the molecular total in all the branches of the contemplated star-branched block copolymers per 100,000 M.W. is, for example, about 370 to 1815, preferably about 740 to 1815, and more preferably about 1111 to 1815 per 100,000 M.W., and the average total molecular number of E units (ethylene and any butene-1 units present as a result of the presence of 1,2-polymerized butadiene units in the corresponding blocks of the precursor polymer), i.e., z in block copolymers (a) and (c), 2z in block copolymer (b), and the molecular total in all the branches of the contemplated star-branched block copolymers per 100,000 M.W. is, for example, about 37 to 1111, preferably about 74 to 1111, and more preferably about 148 to 1111. It should be noted that if the coupling technique is used to prepare the precursors of block copolymers (a), (b) and (c), then the average values of x, y and z will be the same for each block where two blocks composed of the applicable polymerized units are present in the copolymer. However, if a sequential polymerization technique is used, then the average value of x, y and/or z may be somewhat different for each of the two blocks containing the applicable polymerized units in any particular copolymer.

In the residual double bond of formula (2), $R^I$, $R^{II}$, $R^{III}$ and $R^{IV}$ may all be hydrocarbyl groups. The structures of the residual double bonds in the I units defined by formula (2) and in polymerized butadiene are necessary to produce precursor copolymers which can be selectively hydrogenated in the manner described herein to produce the selectively hydrogenated block copolymers of this invention.

The hydrocarbyl group or groups in the formulae (1) and (2) are the same or different and they are substituted or unsubstituted alkyl, alkenyl, cycloalkyl, cycloalkenyl, aryl, alkaryl or aralkyl groups or any isomers thereof. Suitable hydrocarbyl groups are alkyls of 1–20 carbon atoms, alkenyls of 1–20 carbon atoms, cycloalkyls of 5–20 carbon atoms, cycloalkenyls of 5–20 carbon atoms, aryls of 6–12 carbon atoms, alkaryls of 7–20 carbon atoms or aralkyls of 7–20 carbon atoms. Examples of suitable alkyl groups are methyl, ethyl, propyl, butyl, pentyl, hexyl, heptyl, octyl, decyl, methyldecyl or dimethyldecyl. Examples of suitable alkenyl groups are ethenyl, propenyl, butenyl, pentenyl or hexenyl. Examples of suitable cycloalkyl groups are cyclohexyl or methylcyclohexyl. Examples of suitable cycloalkenyl groups are 1-, 2-, or 3-cyclohexenyl or 4-methyl-3-cyclohexenyl. Examples of suitable aryl groups are phenyl or diphenyl. Examples of suitable alkaryl groups are 4-methylphenyl (p-tolyl) or p-ethylphenyl. Examples of suitable aralkyl groups are benzyl or phenethyl. Suitable conjugated dienes of formula (1) used to polymerize the I polymer or random IB copolymer blocks are isoprene, 2,3-dimethylbutadiene, myrcene, 2-phenyl-1,3-butadiene, 2-hexyl-1,3-butadiene, 2-benzyl-1,3-butadiene, 2-p-tolyl-1,3-butadiene or mixtures thereof, preferably isoprene, myrcene or 2,3-dimethylbutadiene, and most preferably isoprene.

The weight average molecular weight ($M_w$) of the block copolymers of this invention may be, for example, in the range of about 30K to $1.5 \times 10^6$ (where K=1000), preferably about 60K to $10^6$, and more preferably about 75K to 500K, while the number average molecular weight ($M_n$) may be, for example, in the range of about 20K to $10^6$, preferably about 40K to 750K, and more preferably about 75K to 500K.

Although the block copolymers of this invention have been exemplified by triblock copolymer (a), and pentablock copolymers (b) and (c) as described hereinbefore, such block copolymers may contain a larger number of blocks as long as one of the two conditions of the invention are met, viz., 1) that the terminal blocks are random IB copolymer and that there is at least one middle or interior E polymer block, or 2) that there are terminal I polymer blocks and at least one each of interior B polymer and E polymer blocks. Such copolymers with a larger number of blocks may contain I polymer or random IB polymer blocks in the interior of the backbone of a linear copolymer or the branches of a star-branched copolymer so as to allow cross-linking to take place in the interior as well as the ends of the backbone or branches, with a controlled large distance between the cross-links of the block copolymer. However, the described triblock copolymer (a) and pentablock copolymers (b) and (c) are preferred. In any case, it is important to have the block copolymer terminated at each end with the I polymer or IB random copolymer blocks to assure that there are unsaturated groups at each end of the block copolymer enabling the block copolymer to be cross-linked or functionalized at the terminal ends thereof. The term "functionalized" is used herein to describe chemical modifications of the unsaturated groups to produce functional groups, the nature of which is described in detail below. The cross-linking of the functionalized and nonfunctionalized copolymer chains is conducted in a conventional manner and is described below.

As is apparent from the foregoing description, the contemplated block copolymers of this invention are obtained by selectively hydrogenating an unhydrogenated precursor block copolymer containing either 1) terminal I polymer blocks which retain some of their saturation after selective hydrogenation, interior blocks of polybutadiene comprising a mixture of 1,4- and 1,2- units as previously described which may be subsequently hydrogenated to the substantially saturated B polymer blocks, and interior blocks of polybutadiene containing at least 80% of 1,4- units which on subsequent selective hydrogenation yield the substantially saturated E polymer blocks, such unhydrogenated block copolymers being the precursors, for example, of pentablock copolymers (b) and (c); or 2) terminal blocks of a random copolymer of an I diene and butadiene wherein the polymerized butadiene units comprise a mixture of 1,4- and 1,2- units as previously described and the polymerized I units retain some of their unsaturation after selective hydrogenation, and at least one interior block of polybutadiene comprising at least 80% of 1,4- units which on selective hydrogenation yield the substantially saturated E polymer blocks, such unhydrogenated block copolymer being the precursor, for example, of triblock copolymer (a).

On being subjected to a selective hydrogenation reaction, the polymerized butadiene units of the precursor block copolymer are hydrogenated to such an extent that they contain substantially none of the original unsaturation, while the polymerized I units retain a sufficient amount of their original unsaturation to vulcanize or cure the block copolymer. Generally, for a block copolymer wherein the I units are polymerized from any of the monomers discussed above, the Iodine Number for the I units after the selective hydrogenation reaction is about 10 to about 100%, preferably about 25 to about 100%, more preferably about 50 to about 100%, and most preferably about 100% of the Iodine Number prior to the selective hydrogenation reaction, and for the B and E polymer blocks, it is about 0 to about 10%, preferably about 0 to about 0.5%, of the Iodine Number prior to the selective hydrogenation reaction. The Iodine Number, as is known to those skilled in the art, is defined as the theoretical number of grams of iodine which will add to the unsaturation in 100 grams of olefin and is a quantitative measurement of unsaturation.

In the block copolymers of the invention, the microstructure of the polymerized I units is not critical and may consist of any combination of 1,2-, 3,4- and 1,4- units, schematically represented below for polyisoprene blocks. When a polar compound is used during the polymerization of the I diene, the polymerized I units comprise primarily (at least about 80%) 3,4- units, the remainder being primarily (about 20%) 1,2- units; when the polar compound is not used during the polymerization of the I diene, the polymerized I units comprise primarily (about 80%) 1,4- units, the remainder being primarily 1,2- and 3,4- units.

When I is isoprene, the polymerized units are as follows:

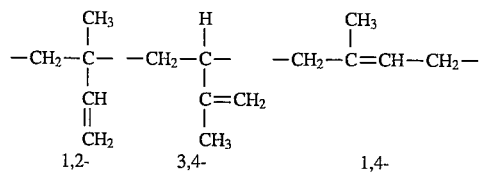

As discussed above, the microstructure of the B polymer blocks should be a mixture of 1,4- and 1,2- units indicated hereinbefore, since the hydrogenation of too high a proportion of 1,4- microstructures produces an amount of crystalline polyethylene which is larger than desired in these blocks. The microstructure of the I and B polymer blocks in the embodiments utilizing such blocks (as well as of the polymerized I dienes or butadiene in any polymers of this invention) is controlled in a conventional manner, e.g., by controlling the amount and nature of the polar compounds used during the polymerization reaction, and the reaction temperature. In one particularly preferred embodiment, the B polymer block contains about 55% of the 1,2- and about 45% wt. of the 1,4- microstructure. The hydrogenation of the polybutadiene blocks containing about 50 to about 60% wt. of the 1,2- microstructure content produces an elastomeric interior block which is substantially an ethylene-butene-1 copolymer having substantially no crystallinity.

The terms 1,2-, 1,4-, and 3,4- microstructure or units as used in this application refer to the products of polymerization obtained, respectively, by the 1,2-, 1,4- and 3,4-, additions of monomer units into the growing polymer chain.

The polymerized 1,4- and 1,2- butadiene units of the precursor polymers of this invention are selectively hydrogenated as shown herein much faster than the polymerized conjugated dienes of formula (1), e.g., the I units. Thus the disubstituted double bonds of the 1,4-polybutadiene units are hydrogenated along with the monosubstituted double bonds of the 1,2-polybutadiene units, while the disubstituted double bonds of, for example, 3,4-polyisoprene units are hydrogenated at a much slower rate than the aforementioned butadienes and little or no hydrogenation of the trisubstituted 1,4-polyisoprene units occurs under the conditions of selective hydrogenation disclosed herein. Furthermore, this is unexpected in view of the teachings of Hoxmeier, Published European Patent Application, Publication No. 0 315 280, previously cited, who discloses that the disubstituted double bonds of the 1,4-polybutadiene units, monosubstituted double bonds of the 1,2-polybutadiene units and disubstituted double bonds of the 3,4-polyisoprene units are hydrogenated simultaneously at substantially similar rates, since they contain Type I unsaturation. It is noted that for block copolymers containing polyisoprene and polybutadiene blocks, Fourier transform infrared (FTIR) analysis of selectively hydrogenated polymers indicates that the hydrogenation of the double bonds of the 1,2-polybutadiene units proceeds most rapidly, followed by the hydrogenation of the double bonds of the 1,4-polybutadiene units. Infrared absorptions caused by these groups disappear prior to appreciable hydrogenation of the polyisoprene units.

As stated, after the precursor block copolymer is prepared, it is subjected to a selective hydrogenation reaction to hydrogenate primarily the polymerized butadiene units of each of the interior polybutadiene blocks or the terminal random IB copolymer blocks. The selective hydrogenation reaction and the catalyst are described in detail below. After the hydrogenation reaction is completed, the selective hydrogenation catalyst is removed from the block copolymer, and the polymer is isolated by conventional procedures, e.g., alcohol flocculation, steam stripping of solvent or non-aqueous solvent evaporation. An anti-oxidant, e.g., Irganox 1076 (from Ciba-Geigy), is normally added to the polymer solution prior to polymer isolation.

The isolated polymer is vulcanizable through the unsaturated end units I by a number of well known processes utilized currently for thermosetting hydrocarbon elastomers. Such processes are detailed in RUBBER TECHNOLOGY, THIRD EDITION, VAN NOSTRAND REINHOLD COMPANY, New York, 1987, Maurice Morton, Editor, chapters 2,9 and 10, incorporated herein by reference.

As stated, the star-branched block copolymers of this invention comprise either 1) a combination of random copolymer blocks $(I_xB_y)$ and polymer blocks $(E_z)$ wherein the free end (i.e., uncoupled end) of each branch of the copolymer is a random copolymer block $(I_xB_y)$; or 2) a combination of polymer blocks $(I_x)$, $(B_y)$ and $(E_z)$ wherein the free end of each branch is a polymer block $(I_x)$. Since each branch of the star-branched copolymer has only a single end, the advantages of the invention obtained as a result of unsaturated polymerized I units in the terminal blocks may be obtained by utilizing half the structure of triblock polymer (a) or pentablock polymers (b) and (c) as each branch of the star-branched polymer. Thus, one type of preferred polymer has branches composed of two blocks, viz., an outermost random IB copolymer block and an interior E polymer block; a second preferred branch has branches composed of three blocks, viz., an outermost I polymer block, a central B polymer block and an innermost E polymer block; and a third preferred polymer has branches also composed of three blocks, viz., an outermost I polymer block, a central E polymer block and an innermost B polymer block. The relative percentages and the ranges of numbers of each type of unit, viz., the total sums of each of x, y and z, are similar to the values for the preferred triblock copolymer (a) and pentablock copolymers (b) and (c) previously described. Furthermore, the selective hydrogenation and resulting reduction in iodine numbers of the star-branched block copolymers are also similar to those of linear polymers (a), (b) and (c) set out hereinbefore.

The block copolymers of this invention having a particularly large number of polymerized I units in the terminal I polymer or IB random copolymer blocks (i.e., containing 100–200 monomer units) have an increased vulcanization rate, as compared to those containing a smaller number of I units in the terminal blocks, and are co-vulcanizable with diene rubbers available in the art, e.g., polybutadiene and natural rubbers. The block polymers containing such large I blocks can be blended with diene rubbers by conventional methods and subsequently vulcanized to produce novel compositions of this invention. The resulting materials are expected to have increased oxidation and ozone degradation resistance as compared to known diene rubbers alone, and therefore are expected to be valuable materials for the production of white sidewalls of tires and similar articles.

In all embodiments of the invention, mixtures of I conjugated dienes may be used to form the I polymer blocks or the IB random copolymer blocks of the contemplated block copolymers. Accordingly, whenever a reference is made herein to an I conjugated diene, it may encompass more than one of such type of monomer or polymerized monomeric unit.

While the block copolymers of this invention have been described primarily in terms of polymerized I, B and E units in the various blocks, it is to be understood that controlled minor amounts of other monomers may be used when preparing the precursors of such blocks. Thus, a minor amount (e.g., about 0.1 to about 30 mole %) of an aryl-substituted olefin, e.g., styrene or other suitable monomers (such as alkylated styrene, vinyl naphthalene or alkylated vinyl naphthalene), may be incorporated in the I, B or random IB blocks for further control of glass transition temperature (Tg), density, solubility parameters and refractive index. Similarly, the scope of this embodiment also encompasses polymers wherein the various blocks may be comprised of the described polymers of an I diene, butadiene, or a mixture of an I diene and butadiene, and a minor amount of any other anionically polymerizable monomer capable of polymerizing with such indicated monomers.

It will be apparent to those skilled in the art that proper choice of polymerization parameters can produce polymers with a great variety of compositional and structural differences, falling within the scope of our invention. For example, changes in composition of the interior B and E polymer blocks or the polymerized B units in the random IB copolymer blocks control the nature of the rubbery properties while changes in the i polymer terminal blocks or the polymerized I units in the IB random copolymer terminal blocks permit response to different vulcanizing agents, e.g., sulfur-based cure systems and phenolic resin cure systems.

Blends Of Inventive Polymers with Other Materials

The block copolymers of this invention can be blended with other rubbers, in which case the degree of unsaturation of the copolymers of the invention can be adjusted so that the vulcanization rate of the two materials is substantially the same. Suitable rubbers which can be blended with the copolymers of this invention are EPDM, butyl rubber and rubbers based on butadiene or isoprene.

The block copolymers of this invention can also be blended with plastics, e.g., isotactic polypropylene, polystyrene, polyethylene, Nylon, polycarbonates, polyesters and styrene-acrylonitrile resins. Thermoplastic elastomers having excellent properties can be obtained by dynamically vulcanizing a blend of polypropylene and the elastomers of our invention, in which the elastomers are cross-linked to a very high degree. A commercial material, Santoprene (trademark of and produced by Monsanto Chemical Co.) is based upon blends of polypropylene and EPDM. Details of the preparation and properties of such blends are presented in THERMOPLASTIC ELASTOMERS, A COMPREHENSIVE REVIEW, edited by N. R. Legge et al., Chapter 7, Hanser Publishers, Munich, Vienna and New York (1987), the contents of which are incorporated herein by reference. Such dynamically vulcanized blends prepared with the polymers of the invention in a conventional manner, e.g., that of N. R. Legge et al., wherein the polymers of this invention are blended with polypropylene, and most particularly wherein the linear triblock and pentablock polymers of this invention are blended with polypropylene, can provide thermoplastic elastomers with unique elastomeric properties.

The block copolymers of this invention can be compounded with ingredients known to those skilled in the art, e.g., fillers such as silica, carbon black, extender oils, anti-oxidants, tackifying agents, vulcanizing agents and similar materials.

Polymerization Reaction

The precursor block copolymers of this invention are polymerized by an anionic polymerization process. Anionic polymerization is well known in the art, and it is utilized in the production of a variety of commercial polymers. An excellent comprehensive review of the anionic polymerization processes appears in the ADVANCES IN POLYMER SCIENCE 56, ANIONIC POLYMERIZATION, pp. 1–90, Springer-Verlag, Berlin, Heidelberg, New York, Tokyo 1984 in a monograph entitled ANIONIC POLYMERIZATION OF NON-POLAR MONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as n-butyl-lithium, sec-butyl-lithium, t-butyl-lithium, sodium naphthalide or cumyl potassium. The amount of the catalyst and the amount of the monomer in the polymerization reaction dictate the molecular weight of the polymer. The polymerization reaction is conducted in solution using an inert solvent as the polymerization medium, e.g., aliphatic hydrocarbons, such as pentane, hexane, cyclohexane or heptane, or aromatic solvents, such as benzene or toluene.

The process, when using a lithium-based catalyst, comprises forming a solution of the isoprene monomer in an inert hydrocarbon solvent, such as cyclohexane. At some point in the process, and necessarily before the formation of the B block or random IB copolymer blocks, the catalyst is modified by the addition of one or more polar compounds selected from the group consisting of ethers, thioethers and tertiary amines, e.g., tetrahydrofuran. The polar compound is necessary to control the microstructure of the B polymer Interior blocks, or the polymerized B units of the random IB copolymer blocks, i.e., the content of the 1,2-structure therein. The higher the content of the polar compounds, the higher will be the content of the 1,2-structure of the polymerized butadiene in these blocks. Since the presence of the polar compound is not essential in the formation of the I polymer blocks with many initiators unless a high 3,4-structure content of the first block is desired, it is not necessary to introduce the polar compound at this stage, since it may be introduced just prior to or together with the addition of the butadiene in forming the B polymer blocks later in the reaction. Examples of polar compounds which may be used are tetrahydrofuran (THF), 1,2-diethoxyethane, dimethyl ether, diethyl ether, ethyl methyl ether, ethyl propyl ether, dioxane, diphenyl ether, tripropyl amine, tributyl amine, trimethyl amine, triethyl amine, and N-,N-,N'-,N'-tetramethyl ethylene diamine. Mixtures of the polar compounds may also be used. The amount of the polar compound depends on the type of the polar compound and the polymerization conditions as will be apparent to those skilled in the art. The effect of the polar compounds on the polybutadiene microstructure is detailed in ANTKOWIAK et al., TEMPERATURE AND CONCENTRATION EFFECTS ON POLAR-MODIFIED ALKYL LITHIUM POLYMERIZATIONS AND COPOLYMERIZATIONS, JOURNAL OF POLYMER SCIENCE: Part A-1, Vol. 10, 1319–1334 (1972), incorporated herein by reference. The polar compounds also accelerate the rate of polymerization.

In forming, for example, pentablock copolymer (b), an alkyl lithium-based initiator and an I diene, e.g., isoprene, monomer are combined in an inert solvent in the absence of a polar compound, and polymerization of the isoprene proceeds to produce the first terminal block whose molecular weight is determined by the ratio of the isoprene to the initiator. The "living" polyisoprenyl anion formed in this first step is utilized as the catalyst for further polymerization. At this time, butadiene monomer is introduced into the system and block polymerization of the second block proceeds, the absence of the polar compound now causing this polybutadiene block to be substantially limited to the 1,4-structure which is the precursor of the desired E polymer block. The resulting product is a living diblock polymer having a terminal anion and a lithium counterion. The living diblock polymer serves as a catalyst for the growth of the central B polymer block, formed when butadiene monomer is added to the reaction vessel together with a polar compound to produce a polybutadiene (B) block made up of both 1,4- and 1,2- units, and containing the anion of the resulting living triblock copolymer. The living triblock anion is then coupled with an appropriate coupling agent to form a precursor pentablock copolymer which may be selectively hydrogenated to form block copolymer (b) containing E polymer blocks. The polymerization reaction is usually conducted at a temperature of between 0° C. and about 100° C., although higher temperatures can be used. Control of a chosen reaction temperature is desirable since it can influence the effectiveness of the polar compound additive in controlling the polymer microstructure. The reaction temperature can be, for example, from 50° to 80° C. The reaction pressure is not critical and varies from atmospheric to about 100 psig.

In forming block copolymer (c) under this invention, an initial polymer block of an I diene, e.g., isoprene, is first formed by contacting such I diene with an anionic catalyst either in the absence of a polar compound, in which case the I diene polymer block is composed mainly of 1,4- units, or in the presence of a polar compound in which case the I diene polymer block has a high proportion of 3,4- units. To the living polymer block is then added butadiene together with a polar compound if no polar compound was used in the formation of the first, i.e., I diene, polymer block, to form a polybutadiene (B) block containing significant proportions of both 1,4- and 1,2- units as previously defined. The polar compound is then removed by various means known in the art, e.g., by vacuum distilling, and an additional amount of butadiene is charged to the reactor forming a third polybutadiene block containing over 80% of 1,4- units. The living triblock copolymer is then coupled to form a pentablock copolymer containing terminal polyisoprene blocks, adjacent to which are polybutadiene blocks containing 1,4- and 1,2- units and a central 1,4-polybutadiene block which is the precursor of an E polymer block. This precursor polymer is then selectively hydrogenated to obtain block copolymer (c).

Triblock copolymer (a) may be prepared by contacting with an anionic catalyst in the presence of a polar compound a mixture of sufficient amounts of conjugated diene I and butadiene to form a living block of random IB copolymer, the polymerized butadiene units of which are composed of no more than about 65% of 1,4- units and at least about 35% of 1,2- units. Most of the polar compound is then removed from the reaction mixture, and an additional amount of butadiene is added to form a living diblock composed of a random IB copolymer block, and at the other end, a polybutadiene block composed of at least about 80% of polymerized 1,4- units. The living diblock is then coupled in the presence of a coupling agent as described to produce a precursor triblock copolymer, which may be selectively hydrogenated to form triblock copolymer (a).

The substitution of myrcene for the isoprene during the polymerization of the I polymer block insures the incorporation of a high proportion of trisubstituted double bonds, even in the presence of polar compounds since myrcene contains a pendant trisubstituted double bond which is not involved in the polymerization process. In a coupling process similar to that described above, block polymers containing polyisoprene end blocks (or any other polymerized monomer suitable for use in the I polymer block) having a high 3,4-microstructure content can be obtained by adding the polar compound prior to the isoprene (or other monomer) polymerization.

The use of the coupling technique for the production of triblock and pentablock polymers greatly reduces the reaction time necessary for the completion of polymerization, as compared to a sequential addition of monomers utilized to prepare each block. Such coupling techniques are well known and utilize coupling agents, such as esters, $CO_2$, iodine, dihaloalkanes, silicon tetrachloride, divinyl benzene, alkyltrichlorosilanes and dialkyldichlorosilanes. The use of tri- or tetra-functional coupling agents, such as alkyltrichlorosilanes or silicon tetrachloride, permits the formation of macromolecules having 1- or 2- main chain branches, respectively. The addition of divinyl benzene as a coupling agent has been documented to produce molecules having up to 20 or more separately joined segments.

The use of some of the coupling agents provides a convenient means of producing star-branched block polymers. The star-branched block polymers are made from any combination of blocks I, B and E or random IB and E, discussed above, providing that each free end (i.e., uncoupled end) of the star-branched polymer is either an I or a random IB block, respectively. The molecular weight of the star-branched block copolymers will depend on the number of branches in each such copolymer, as will be apparent to those skilled in the art.

Suitable coupling agents and reactions are disclosed in the following references which are incorporated herein by reference: U.S. Pat. Nos. 3,949,020; 3,594,452; 3,598,887; 3,465,065; 3,078,254; 3,766,301; 3,632,682; 3,668,279; and British patents 1,014,999; 1,074,276; 1,121,978.

Selective Hydrogenation

The precursor block copolymer is selectively hydrogenated to saturate the interior polybutadiene blocks of each of the pentablocks. The method of selectively hydrogenating the polybutadiene block is similar to that of Falk, "Coordination Catalysts For The Selective Hydrogenation of Polymeric Unsaturation" JOURNAL OF POLYMER SCIENCE: PART A-1, Volume 9, 2617–2623 (1971), and may be conducted with the novel hydrogenation catalyst and process used herein. Any other known selective hydrogenation methods may also be used, as will be apparent to those skilled in the ark, but it is preferred to use the method described herein. In summary, the selective hydrogenation method preferably used herein comprises contacting the previously prepared block copolymer with hydrogen in the presence of the novel catalyst composition.

The novel hydrogenation catalyst composition and hydrogenation process are described in detail in application Ser. No. 07/466,136, filed Jan. 16, 1990, by T. S. Coolbaugh et al. The hydrogenation catalyst composition is synthesized from at least one transition metal compound and an organometallic reducing agent.

Suitable transition metal compounds are compounds of metals of Group IVb, Vb, VIb, or VIII, preferably IVb or VIII of the Periodic Table of the Elements, published in LANGE's HANDBOOK OF CHEMISTRY (13th Edition, 1985, McGraw-Hill Book Company, New York, John A. Dean, Editor). Non-limiting examples of such compounds are metal halides, e.g., titanium tetrachloride, vanadium tetrachloride; vanadium oxytrichloride, titanium and vanadium alkoxides, wherein the alkoxide moiety has a branched or unbranched alkyl radical of 1 to about 20 carbon atoms, preferably 1 to about 6 carbon atoms. Preferred transition metal compounds are metal carboxylates or alkoxides of Group IVb or VIII of the Periodic Table of the Elements, such as nickel (II) 2-ethylhexanoate, titanium isopropoxide, cobalt (II) octoate, nickel (II) phenoxide and ferric acetylacetonate.

The organometallic reducing agent is any one or a combination of any of the materials commonly employed to activate Ziegler-Natta olefin polymerization catalyst components containing at least one compound of the elements of Groups Ia, IIa, IIb, IIIa, or IVa of the Periodic Table of the Elements. Examples of such reducing agents are metal alkyls, metal hydrides, alkyl metal hydrides, alkyl metal halides, and alkyl metal alkoxides, such as alkyllithium compounds, dialkylzinc compounds, trialkylboron compounds, trialkylaluminum compounds, alkylaluminum halides and hydrides, and tetraalkylgermanium compounds. Mixtures of the reducing agents may also be employed. Specific examples of useful reducing agents include n-butyllithium, diethylzinc, di-n-propylzinc, triethylboron, diethylaluminumethoxide, triethylaluminum, trimethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic reducing agents which are preferred are Group IIIa metal alkyls and dialkyl metal halides having 1 to about 20 carbon atoms per alkyl radical. More preferably, the reducing agent is a trialkylaluminum compound having 1 to about 6 carbon atoms per alkyl radical. Other reducing agents which can be used herein are disclosed in Stevens et al., U.S. Pat. No. 3,787,384, column 4, line 45 to column 5, line 12 and in Strobel et al., U.S. Pat. No. 4,148,754, column 4, line 56 to column 5, line 59, the entire contents of both of which are incorporated herein by reference. Particularly preferred reducing agents are metal alkyl or hydride derivatives of a metal selected from Groups Ia, IIa and IIIa of the Periodic Table of the Elements, such as n-butyl-lithium, sec-butyl-lithium, n-hexyl-lithium, phenyl-lithium, triethylaluminum, tri-isobutylaluminum, trimethylaluminum, diethylaluminum hydride and dibutylmagnesium.

The molar ratio of the metal derived from the reducing agent to the metal derived from the transition metal compound will vary for the selected combinations of the reducing agent and the transition metal compound, but in general it is about 1:1 to about 12:1, preferably about 1.5:1 to about 8:1, more preferably about 2:1 to about 7:1 and most preferably about 2.5:1 to about 6:1. It will be apparent to those skilled in the art that the optimal ratios will vary depending upon the transition metal and the organometallic agent used, e.g., for the trialkylalumium/nickel(II) systems the preferred aluminum: nickel molar ratio is about 2.5:1 to about 4:1, for the trialkylaluminum/cobalt(II) systems the preferred aluminum: cobalt molar ratio is about 3:1 to about 4:1 and for the trialkylaluminum/titanium(IV) alkoxides systems, the preferred aluminum: titanium molar ratio is about 3:1 to about 6:1.

The mode of addition and the ratio of the reducing agent to the transition metal compound are important in the production of the novel hydrogenation catalysts having superior selectivity, efficiency and stability, as compared to prior art catalytic systems. During the synthesis of the hydrogenation catalysts it is preferred to maintain the molar ratio of the reactants used to synthesize the catalyst substantially constant. This can be done either by the addition of the reducing agent as rapidly as possible to a solution of the transition metal compound, or by a substantially simultaneous addition of the separate streams of the reducing agent and the transition metal compound to a catalyst synthesis vessel in such a manner that the selected molar ratios of the metal of the reducing agent to the metal of the transition metal compound are maintained substantially constant throughout substantially the entire time of addition of the two compounds. The time required for the addition must be such that excessive pressure and heat build-up are avoided, i.e., the temperature should not exceed about 80° C. and the pressure should not exceed the safe pressure limit of the catalyst synthesis vessel.

In a preferred embodiment, the reducing agent and the transition metal compound are added substantially simultaneously to the catalyst synthesis vessel in such a manner that the selected molar ratio of the reducing agent to the transition metal compound is maintained substantially constant during substantially the entire time of the addition of the two compounds. This preferred embodiment permits the control of the exothermic reaction so that the heat build-up is not excessive, and the rate of gas production during the catalyst synthesis is also not excessive; accordingly, the gas build-up is relatively slow. In this embodiment, carried out with or without solvent diluent, the rate of addition of the catalyst components is adjusted to maintain the synthesis reaction temperature at or below about 80° C., which promotes the formation of the selective hydrogenation catalyst. Furthermore, the selected molar ratios of the metal of the reducing agent to the metal of the transition metal compound are maintained substantially constant throughout the entire duration of the catalyst preparation when the simultaneous mixing technique of this embodiment is employed.

In another embodiment, the catalyst is formed by the addition of the reducing agent to the transition metal compound. In this embodiment, the timing and the order of addition of the two reactants is important to obtain the hydrogenation catalyst having superior selectivity, efficiency and stability. Thus, in this embodiment, it is important to add the reducing agent to the transition metal compound in that order in as short a time period as practically possible. In this embodiment, the time allotted for the addition of the reducing agent to the transition metal compound is critical for the production of the catalyst. The term "as short a time period as practically possible" means that the time of addition is as rapid as possible, such that the reaction temperature is not higher than about 80° C. and the reaction pressure does not exceed the safe pressure limit of the catalyst synthesis vessel. As will be apparent to those skilled in the art, that time will vary for each synthesis and will depend on such factors as the types of the reducing agents, the transition metal compounds and the solvents used in the synthesis, as well as the relative amounts thereof, and the type of the catalyst synthesis vessel used. For purposes of illustration, a solution of about 15 ml of triethylaluminum in hexane should be added to a solution of nickel(II) octoate in mineral spirits in about 0–30 seconds. Generally, the addition of the reducing agent to the transition metal compound should be carried out in about 5 seconds (sec) to about 5 minutes, depending on the quantities of the reagents used. If the time period during which the reducing agent is added to the transition metal compound is prolonged, e.g., more than 15 minutes, the synthesized catalyst is less selective, less stable and may be heterogeneous.

In the embodiment wherein the reducing agent is added as rapidly as possible to the transition metal compound, it is also important to add the reducing agent to the transition metal compound in the aforementioned sequence to obtain the novel catalyst. The reversal of the addition sequence, i.e., the addition of the transition metal compound to the reducing agent, or the respective solutions thereof, is detrimental to the stability, selectivity, activity and homogeneity of the catalyst and is therefore undesirable.

In all embodiments of the hydrogenation catalyst synthesis, it is preferred to use solutions of the reducing agent and the transition metal compound in suitable solvents, such as hydrocarbon solvents, e.g., cyclohexane, hexane, pentane, heptane, benzene, toluene or mineral oils. The solvents used to prepare the solutions of the reducing agent and of the transition metal compound may be the same or different, but if they are different, they must be compatible with each other so that the solutions of the reducing agent and the transition metal compound are fully soluble in each other.

The hydrogenation process comprises contacting the unsaturated polymer to be hydrogenated with an amount of the catalyst solution containing about 0.1 to about 0.5, preferably about 0.2 to about 0.3 mole percent of the transition metal based on moles of the polymer unsaturation. The hydrogen partial pressure is about 5 psi to about several hundred psi, but preferably it is about 10 to about 100 psi. The temperature of the hydrogenation reaction mixture is about 25° to about 80° C., since higher temperatures may lead to catalyst deactivation. The length of the hydrogenation reaction may be as short as 30 minutes and, as will be apparent to those skilled in the art, depends to a great extent on the actual reaction conditions employed. The hydrogenation process may be monitored by any conventional means, e.g., infra-red spectroscopy, hydrogen flow rate, total hydrogen consumption, or any combination thereof.

After the hydrogenation reaction is completed, the hydrogenation catalyst must be removed from the polymer, for example, by washing twice with equal volumes of 10% aqueous citric acid solution also containing 5% isopropanol at 60° C. The polymer solution is then water washed and the polymer isolated by conventional methods, e.g., steam or alcohol flocculation or solvent evaporation.

Cross-linking And Functionalization Of The Terminal Blocks

In addition to acting as sites for vulcanization, the unsaturated terminal blocks of the block polymers of this invention can be chemically modified to provide benefits obtained with similar modifications of existing commercial materials, such as butyl rubber or EPDM. In some instances, the benefits obtained by a chemical modification of butyl rubber or EPDM may be magnified using the elastomers of our invention as a matrix instead of the butyl rubber or EPDM because of their intrinsically superior elastomeric properties.

An example of such a chemical modification of the polymers of this invention is sulfonation of the olefinic unsaturation of the polymerized I units or polymerized dienes of formula (1) of any polymers of this invention containing the polymerized I units or polymerized dienes of formula (1), followed by neutralization of the thus formed polymeric sulfonic acid with metal ions or amines. When such a modification is performed on a commercial ethylene-propylene-diene monomer (EPDM) rubber, a thermoplastic elastomer which behaves like a vulcanized rubber at room temperature but can be shaped at higher temperatures is produced. A description of an example of a process for and product description of such a chemically modified EPDM can be found in IONS IN POLYMERS, Advances in Chemistry Series 187, American Chemical Society, Washington, D.C. 1980, pp. 3–53, incorporated herein by reference. Following the procedures used for EPDM described in the aforementioned publication with the block copolymers of our invention, thermoplastic elastomers with greatly improved elongation properties were prepared.

It is known that the halogenation of the unsaturation in butyl rubber (based upon isoprene monomer) prior to the vulcanization treatment, produces dramatic changes in vulcanization rate and provides greater versatility in the choice of vulcanizing agents. Since the residual unsaturated groups in the block copolymers of our invention present in the polymerized I units may also be based on isoprene monomer, the halogenation of the polymer of this embodiment provides the same benefits, but with the retention of the greater elongation characteristics and resistance to cold flow inherent in the invention polymer. The same benefits will be obtained with any other dienes which can be used to prepare the I polymer or random IB copolymer blocks of the invention, and therefore any polymers of this invention containing any such dienes can be halogenated in the same manner as the butyl rubber. Any other polymers of this invention containing the polymerized dienes of formula (1) or polymerized I units can also be halogenated in the same manner.

It is also known that the reaction of EPDM with maleic anhydride at elevated temperatures (e.g., about 150° C. to about 250° C.) produces maleic modified EPDM which is used commercially as an impact modifier, particularly for Nylon. Similar modification of the polymers of any embodiments of our invention occurs readily, since the residual isoprene unsaturation, primarily of the illustrated 3,4-type, is more reactive with maleic anhydride than are the internal bonds found in EPDM. The resultant impact modifier, because of its greater elongation, provides superior properties when blended with Nylon.

EPDM polymers which have been modified with polar functionality are utilized as dispersant type viscosity index improvers in multigrade lubricants. A great number of patents are devoted to such modifications. Any of the modifications performed on EPDM for this purpose can be performed with the polymers of this invention. Typical modifications which can be used with the polymers of this invention are described in: U.S. Pat. Nos. 3,099,644; 3,257, 349; 3,448,174; 3,997,487; 3,870,841; 3,642,728; 3,847, 854; 3,437,556; 4,557,849; 4,032,700; 3,899,434; 4,557, 847; 4,161,452; 4,170,562; 4,517,104; 4,320,017; 4,502, 972; 4,098,710; 4,007,121; 4,011,380; 4,033,888; 4,145, 298; 4,402 844; 4,146,489 and British patent 1,072,796, the disclosures of all of which are incorporated herein by reference.

The above examples illustrate only some of the potentially valuable chemical modifications of the polymers of this invention. The high molecular weight block polymers of this invention, providing a means for a wide variety of chemical modifications only at the ends of the molecule (i.e., at the I polymer or random IB copolymer blocks only), present the opportunity to prepare materials previously impossible because of the lack of availability of such polymers. Some examples of well known chemical reactions which can be performed on polymers of this invention are found in E. M. FETTES, CHEMICAL REACTIONS OF POLYMERS, High Polymers, Vol. 19, John Wiley, New York, 1964, incorporated herein by reference.

Our invention provides block hydrocarbon polymers capable of being vulcanized to a perfect network with a distance between cross-links substantially equivalent to the dimensions of the unvulcanized elastomeric molecule. In addition to the expected improvements in elastomeric properties, the saturated main chain of the polymers of our invention provides a high degree of oxidative and thermal stability. Unique materials can also be obtained by chemical modifications of the block polymers of this invention, since such modifications can be carried out selectively only at the unsaturated terminal ends of the molecules.

The cross-linking of the selectively hydrogenated block polymers of this invention is conducted in a conventional manner by contacting the block copolymer with a suitable cross-linking agent or a combination of such agents. The cross-linking process produces a copolymer having uniform distance between cross-links.

The block copolymers can also be functionalized by reacting the terminal blocks containing unsaturated groups with various reagents to produce functional groups, such as hydroxyl, epoxy, sulfonic acid, mercapto, acrylate or carboxyl groups. Functionalization methods are well known in the art.

The block copolymers, including the star-branched polymers, of this invention can be used in a variety of applications, e.g., to produce electrical insulation, pressure sensitive adhesives, sealants, rubberized asphalts, in automotive applications, e.g., hoses, tubing, weatherstripping, in construction industry, e.g., to produce gaskets, rubber sheeting for roofing, pond and ditch liners, and in many other applications.

The following examples further illustrate additional features of the invention. However, it will be apparent to those skilled in the art that the specific reactants and reaction conditions used in the examples do not limit the scope of the invention.

In all of the following examples, the experimental work was performed with dried reactors and equipment and under strictly anaerobic conditions. Extreme care must be used to exclude air, moisture and other impurities capable of interfering with the delicate chemical balance involved in the synthesis of the polymers of this invention, as will be apparent to those skilled in the art.

EXAMPLE 1

This example illustrates the preparation of a polymer which is a precursor of the type of pentablock copolymer (b), such precursor polymer having terminal polyisoprene blocks, two short blocks of 1,4-polybutadiene interior to the polyisoprene end blocks and exterior to a central polybutadiene block, which forms the major portion of the polymer. A procedure was used as described below, whereby the polyisoprene blocks were predominantly of the 1,4- microstructure, the central polybutadiene block was less than 50% of the 1,4- microstructure and the two polybutadiene blocks adjacent to the end blocks contained over 90% of the 1,4- microstructure.

The preparation was carried out under nitrogen atmosphere in a two-quart glass bowled stirred pressure reactor equipped with an air-driven stirrer, a pressure gauge, a thermometer well, a heat exchange coil, a top surface inlet valve, a dip tube feeder with valve, a syringe injection port containing a viton rubber gasket and a blow-out disk (200 psi). To the reactor were added, in sequence, 1200 mL of dry cyclohexane, 12.8 mL (8.72 grams) of isoprene, and 3 mg of dipyridyl indicator. The mixture was warmed to 50° C. and titrated with 1.6 molar n-butyl lithium (0.2 mL) to an orange color. After a few minutes 1.7 mL of a 1.7 molar solution (2.89 moles) of t-butyl lithium were added. Polymerization was allowed to proceed for 18 hours, although it is estimated that 4 hours at 50° C. would have been sufficient time to complete polymerization of the initial polyisoprene blocks. Next, 5.0 grams of butadiene were added and the reaction was allowed to proceed an additional 5 hours. Two mL of a 1.0 molar solution of 1,2-diethoxyethane in cyclohexane were injected into the reactor, followed by 86 grams of butadiene. The diethoxyethane produced a high 1,2- unit content for this polybutadiene block and dramatically increased the rate of polymerization such that the monomer was consumed within an hour. Then, 15.48 ml of a 0.28 molar cyclohexane solution (4.33 mmoles) of phenylbenzoate were added to couple the triblock anion. The mixture was stirred at 50°–55° C. for an additional 30 minutes. A sample of the polymer was isolated and analyzed by gel permeation chromatography (GPC). The number average molecular weight ($M_n$) was 73,800.

EXAMPLE 2

This example illustrates the selective hydrogenation of the polybutadiene blocks in the pentablock copolymer of Example 1.

Pentane in an amount of 200 mL containing 20 grams of dissolved pentablock polymer as prepared in Example 1 was introduced into a Parr shaker hydrogenation apparatus. This amount of polymer represents 0.32 mole of polybutadiene unsaturation. The hydrogenation catalyst was prepared by adding 10.8 mL of a nickel octoate solution (6% by weight nickel) to a solution of 45.2 millimoles of triethyl aluminum in 102.2 mL of hexane. The nickel octoate was added slowly (over about 1 hour) using a syringe pump to give a final catalyst solution which was 0.1 molar in nickel and had an Al/Ni molar ratio of 3.6/1. Six mL of this catalyst solution were added to the polymer solution in the Parr shaker. The shaker apparatus was purged 4 times with 50 psig hydrogen, pressured to 50 psig with hydrogen, and heated to 50° C. Temperature was maintained at 50° C. and the reaction vessel was shaken for about four hours. Analysis of an aliquot of the product by FTIR demonstrated complete loss of absorption related to the 1,2-butadiene (910 and 994 cm$^{-1}$) and trans 1,4-butadiene (967 cm$^{-1}$), and NMR analysis showed retention of over 50% of the 1,4- isoprene double bonds originally present in the precursor polymer. The reaction mixture was degassed and treated with 3–4 drops of Jeffamine D-2000 (a polyether diamine) and 1 mL of HCl (6 N). After stirring for a short time, the dark catalyst color had discharged and the solution was added to 200 mL of isopropanol containing an anti-oxidant (0.5 g of Irganox 1076). The precipitated polymer was isolated and dried in a vacuum oven. Analysis of the polymer indicated that its molecular weight was substantially unchanged and that essentially no residual nickel was present (less than 1 ppm).

The foregoing selective hydrogenation was found to be effective to substantially completely hydrogenate (99.7%) the polybutadiene blocks, including the conversion of the central block substantially to straight chain polyethylene, while allowing sufficient unsaturation in the polyisoprene blocks so that the polymer could be effectively vulcanized. After such hydrogenation, the molecular weight of the polymer was essentially unchanged. The unvulcanized polymer had greatly improved resistance to cold flow due to the crystallinity of the central polyethylene block, as compared to a similar polymer but without such polyethylene block, i.e., a polyisoprene-polybutadiene-polyisoprene triblock copolymer wherein the polybutadiene contains a substantial number of 1,2 - units.

EXAMPLE 3

This example illustrates the preparation of a pentablock copolymer (c) including the precursor pentablock copolymer and its selective hydrogenation.

Two hundred grams of purified cyclohexane and a small amount (ca. 3 mg) of bipyridyl were introduced into a 600 mL stirred glass reactor equipped with an air-driven stirrer, a pressure gauge, thermocouple, top surface inlet valve, dip tube feeder with valve, heating-mantle with variable controller and combination nitrogen/vacuum inlet with valve. Air was removed from the reactor under vacuum and replaced by dry nitrogen. Following this, 7.0 mL of isoprene (70 mmol) and 4.0 mL (49.3 mmol) of tetrahydrofuran freshly distilled from benzophenone ketyl were introduced into the reactor. The temperature of the reactor and its contents was raised to 50° C. and the solution was titrated by addition of 1.6 M butyl lithium until a persistent red color was obtained (0.3 mL). Following this, 0.63 mL of 1.6 M butyl lithium (1.01 mmol) were injected into the reactor in order to initiate polymerization of the isoprene. The reaction was allowed to run for one hour at 60° C., after which 30.4 g of purified butadiene (0.563 mol) were pressured into the reactor while maintaining a temperature of 60° C. After one hour, the reactor pressure had returned to the level prior to butadiene addition (25 psi) and formation of the second block of the copolymer was complete.

About half the solvent was then removed from the reactor by means of reduced pressure and collected in a trap cooled with Dry Ice. Gas chromatography and nuclear magnetic resonance of the collected solvent showed the presence of a significant amount of THF, thereby indicating the successful removal of a substantial percentage of the initial THF. One hundred fifty mL of dry solvent were then reintroduced, via pressure cylinder, into the reactor and 4.8 g of purified butadiene (89 mmol) were introduced. This third block was allowed to polymerize overnight at room temperature, after which 0.5 millimole of dichlorodimethylsilane was added to effect coupling to give the desired precursor pentablock polymer with a central polybutadiene block of low vinyl content, i.e., containing more than 80% of 1,4- units.

The resultant polymer solution was then selectively hydrogenated. Six mL of Al/Co homogeneous catalyst (Al/Co=3.0,[Co]=0.133 M) were added to the above polymer solution and the mixture was flushed several times with hydrogen, after which the polymer was hydrogenated at 55 psi hydrogen without heating. Within 30 minutes, the temperature had risen to 55° C. and after 6 hours the temperature had returned to room temperature. Fourier transform infrared showed that essentially all of the butadiene unsaturation had been hydrogenated and that 70% of the isoprene vinylidene groups remained. Hydrogenation was stopped and catalyst residues were removed by citric acid washing followed by inverse alcohol flocculation to give the desired pentablock copolymer (c) as a light-colored solid mass with a reduced tendency to cold-flow.

The procedure of this example can also be followed in preparing triblock copolymer (a) except that, instead of preparing an initial living triblock by sequential addition of isoprene, butadiene and, after removal of THF, an additional amount of butadiene, the initial amounts of isoprene and butadiene are added to the reactor concurrently to form a living random copolymer of isoprene and butadiene wherein the polymerized butadiene comprises significant proportions of 1,4- and 1,2- units. A substantial percentage of THF is then removed as described and an additional amount of butadiene is added which forms a living diblock wherein the second block is composed of polybutadiene containing at least about 20% of 1,4 - units. This living diblock is then coupled as described to form a precursor triblock copolymer containing end blocks of a random isoprene/butadiene copolymer wherein the polymerized butadiene comprises substantial proportions of 1,2- units as well as 1,4- units, and a central polybutadiene block containing a greatly decreased number of 1,2- units. The precursor polymer is then selectively hydrogenated as described to form triblock copolymer (a).

In addition to excellent resistance to cold flow, the unvulcanized polymers of Examples 1 and 3 as well as the other unvulcanized polymers of this invention have excellent oxidative, thermal and pyrolytic stability. After vulcanization, the polymers of the invention also have excellent elasticity at elevated temperatures and a high degree of resistance to solvents.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of preparing a pentablock copolymer in which the terminal blocks are each a polymer of at least one conjugated diene I which contains at least five carbon atoms with at least one of each pair of double-bonded carbon atoms in the polymerized diene I units being additionally single-bonded to two carbon atoms; blocks intermediate the terminal blocks and a central block which are polybutadiene composed of at least about 80% of 1,4- units, and a central block which is a polybutadiene composed of not more than about 65% of 1,4- units and least about 35% of polymerized 1,2- units; comprising (i) contacting with an anionic catalyst in the absence of a polar compound a sufficient amount of conjugated diene I to form a living block of I polymer, (ii) adding to the reaction mixture a sufficient amount of butadiene to form a living diblock composed of said I polymer block and a first polybutadiene block composed of at least about 80% of 1,4- units, (iii) adding to the reaction mixture a polar compound and an additional amount of butadiene to form a living triblock composed of said I polymer block at one end, a first polybutadiene block, and at the other end, a second living block of polybutadiene composed of no more than about 65% of 1,4- units and at least about 35% of 1,2- units, and (iv) coupling the living triblock in the presence of a coupling agent to produce said pentablock copolymer.

2. The method of claim 1 wherein said pentablock copolymer is selectively hydrogenated so that each of said polybutadiene blocks is substantially completely hydrogenated, while each of said I polymer blocks retains a sufficient amount of its original unsaturation to vulcanize said pentablock copolymer.

3. The method of claim 1 wherein said selectively hydrogenated pentablock copolymer is subjected to a vulcanization treatment.

4. The method of claim 1 wherein said coupling agent is selected from the group consisting of esters, $CO_2$, iodine, dihaloalkanes, silicon tetrachloride, alkyltrichlorosilanes, dialkyldichlorosilanes, and divinyl benzene.

5. A method of preparing a pentablock copolymer in which terminal blocks are each a polymer of at least one conjugated diene I which contains at least five carbon atoms with at least one of each pair of double-bonded carbon atoms in the polymerized diene I units being additionally single-bonded to two carbon atoms; blocks intermediate the terminal blocks and the central block are polybutadiene composed of not more than about 65% of 1,4- units and at least about 35% of polymerized 1,2- units; and a central block is a polybutadiene composed of at least about 80% of 1,4- units; comprising (i) contacting with an anionic catalyst a sufficient amount of conjugated diene I to form a living block of I polymer, (ii) adding, in the presence of a polar compound, a sufficient amount of butadiene to form a living diblock composed of said I polymer block and a first block of polybutadiene composed of no more than about 65% of 1,4- units and at least about 35% of 1,2- units, (iii) removing most of said polar compound from said reaction mixture, (iv) adding an additional amount of butadiene to form a living triblock composed of said I polymer block at one end, the first polybutadiene block, and at the other end, a second living block of polybutadiene composed of at least about 80% of 1,4- units, and (v) coupling the living triblock in the presence of a coupling agent to produce said pentablock copolymer.

6. The method of claim 5 wherein said polar compound is added to the system prior to the formation of said initial living block of I polymer.

7. The method of claim 5 wherein said polar compound is added to the system subsequent to the formation of said initial block of I polymer and prior to the formation of said living diblock composed of said I polymer block and said first block of polybutadiene.

8. The method of claim 5 wherein said pentablock copolymer is selectively hydrogenated so that each of said polybutadiene blocks is substantially completely hydrogenated, while each of said I polymer blocks retains a sufficient amount of its original unsaturation to vulcanize said pentablock copolymer.

9. The method of claim 8 wherein said selectively hydrogenated pentablock copolymer is subjected to a vulcanization treatment.

10. The method of claim 5 wherein said coupling agent is selected from the group consisting of esters, $CO_2$, iodine, dihaloalkanes, silicon tetrachloride, alkyltrichlorosilanes, dialkyldichlorosilanes, and divinyl benzene.

11. A method of preparing a triblock copolymer in which the terminal blocks are each a random copolymer of at least one diene I and butadiene wherein the polymerized butadiene B units are composed of not more than about 65% of 1,4- units and at least about 35% of 1,2- units and a central polybutadiene block composed of at least about 80% of polymerized 1,4- units, comprising (i) contacting with an anionic catalyst in the presence of a polar compound sufficient amounts of conjugated diene I and butadiene B to form a living block of random IB copolymer, the polymerized butadiene units of which are composed of no more than about 65% of 1,4- units and least about 35% of 1,2- units, (ii) removing most of said polar compound from said reaction mixture, (iii) adding an additional amount of butadiene to form a living diblock composed of said random IB copolymer block, and at the other end, a living block of polybutadiene composed of at least about 80% of 1,4- units, and (iv) coupling the living diblock in the presence of a coupling agent to produce said triblock copolymer.

12. The method of claim 11 wherein said triblock copolymer is selectively hydrogenated so that the polymerized butadiene units in said random IB copolymer terminal blocks and said central polybutadiene block are substantially completely hydrogenated, while said polymerized I diene units in said terminal random IB copolymer blocks retain a sufficient amount of their original unsaturation to vulcanize said triblock copolymer.

13. The method of claim 12 wherein said selectively hydrogenated triblock copolymer is subjected to a vulcanization treatment.

14. The method of claim 11 wherein said coupling agent is selected from the group consisting of esters, $CO_2$, iodine, dihaloalkanes, silicon tetrachloride, alkyltrichlorosilanes, dialkyldichlorosilanes, and divinyl benzene.

* * * * *